R. J. F. TELTZROW.
MANURE LOADER.
APPLICATION FILED NOV. 14, 1914.

1,266,174.

Patented May 14, 1918.
3 SHEETS—SHEET 1.

WITNESSES
A. F. Miller.
Emily Schowalter.

INVENTOR
Robert J. F. Teltzrow,
By Morsell, Keeney & French,
ATTORNEYS.

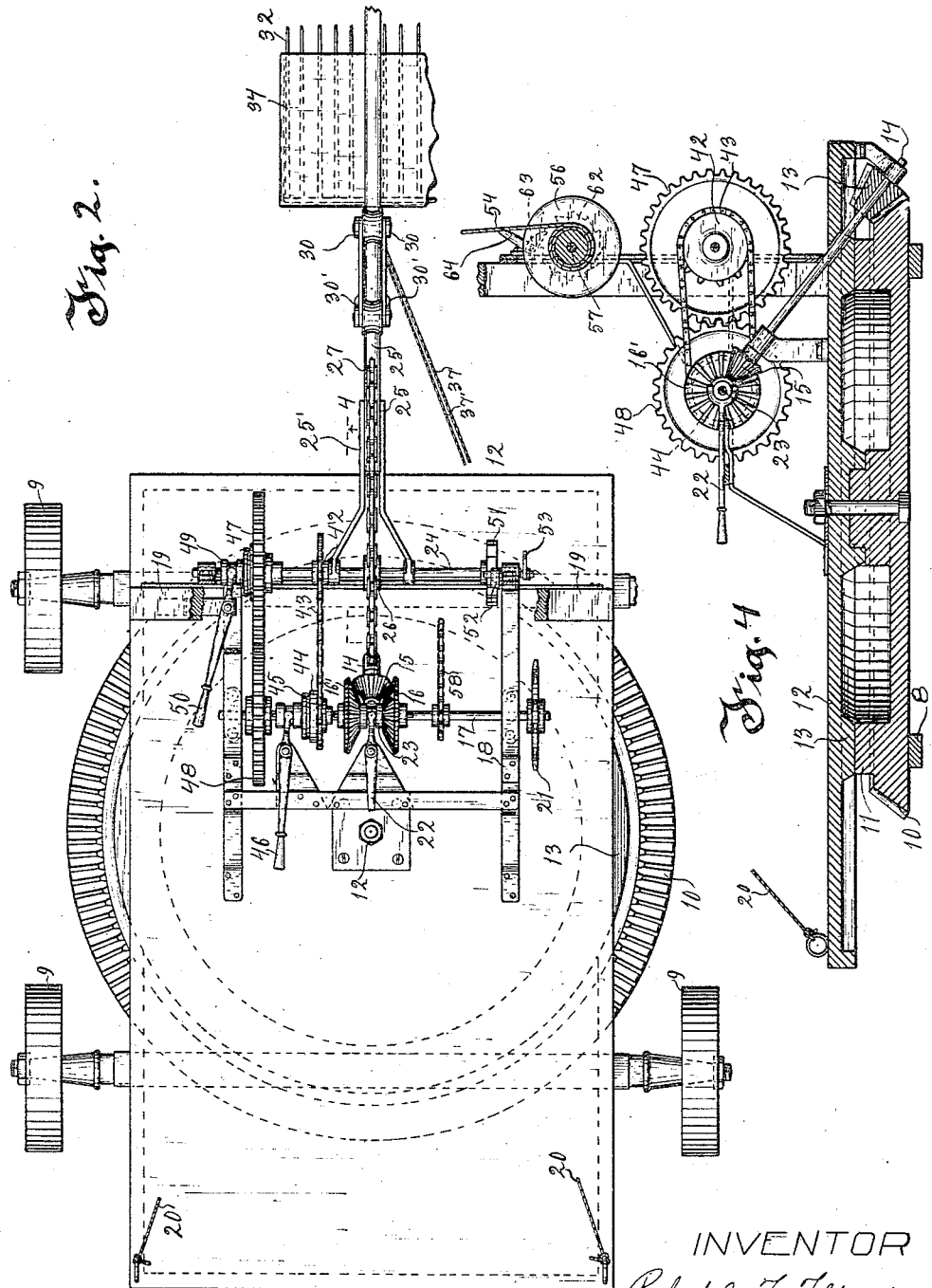

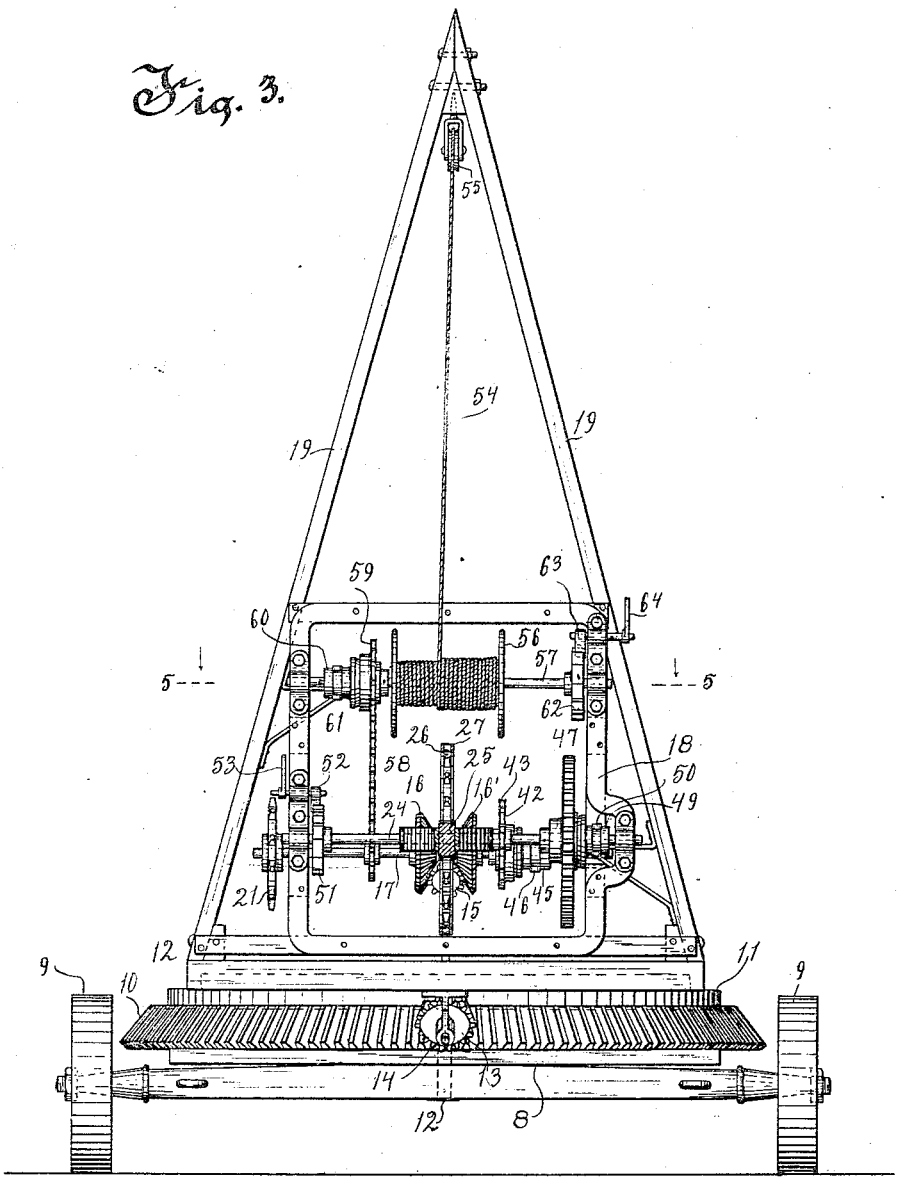

UNITED STATES PATENT OFFICE.

ROBERT J. F. TELTZROW, OF BEAVER DAM, WISCONSIN.

MANURE-LOADER.

1,266,174.  Specification of Letters Patent.  Patented May 14, 1918.

Application filed November 14, 1914. Serial No. 872,080.

*To all whom it may concern:*

Be it known that I, ROBERT J. F. TELTZROW, a citizen of the United States, and resident of Beaver Dam, in the county of Dodge and State of Wisconsin, has invented new and useful Improvements in Manure-Loaders, of which the following is a description, reference being had to the accompanying drawings, which are a part of this specification.

This invention relates to improvements in manure loaders.

It is one of the objects of the present invention to provide a manure loader which is particularly adapted for handling manure in large quantities and with expediency.

A further object of the invention is to provide a manure loader of the portable type which is adapted to automatically pick up a load of material from a distant point and convey it to a point of discharge and then discharge the material.

A further object of the invention is to provide a manure loader having means for raising and lowering its charge of material and for swinging the load conveying device to any desired point.

A further object of the invention is to provide a manure loader mounted to be easily moved from place to place and having all actuating mechanism conveniently located so that it can be controlled by one operator.

A further object of the invention is to provide a manure loader which is of simple construction, is strong and durable and is well adapted for the purpose described.

With the above and other objects in view the invention relates to the improved manure loader and its parts and combinations as set forth in the claims, and all equivalents thereof.

In the accompanying drawings in which the same reference characters indicate the same parts in all of the views:

Fig. 2 is a horizontal sectional view thereof taken on line 2—2 of Fig. 1;

Fig. 3 is a vertical sectional view of the loader taken on line 3—3 of Fig. 1; and Fig. 4 is a longitudinal sectional view thereof taken on line 4—4 of Fig. 2 and on a larger scale.

Figure 1:
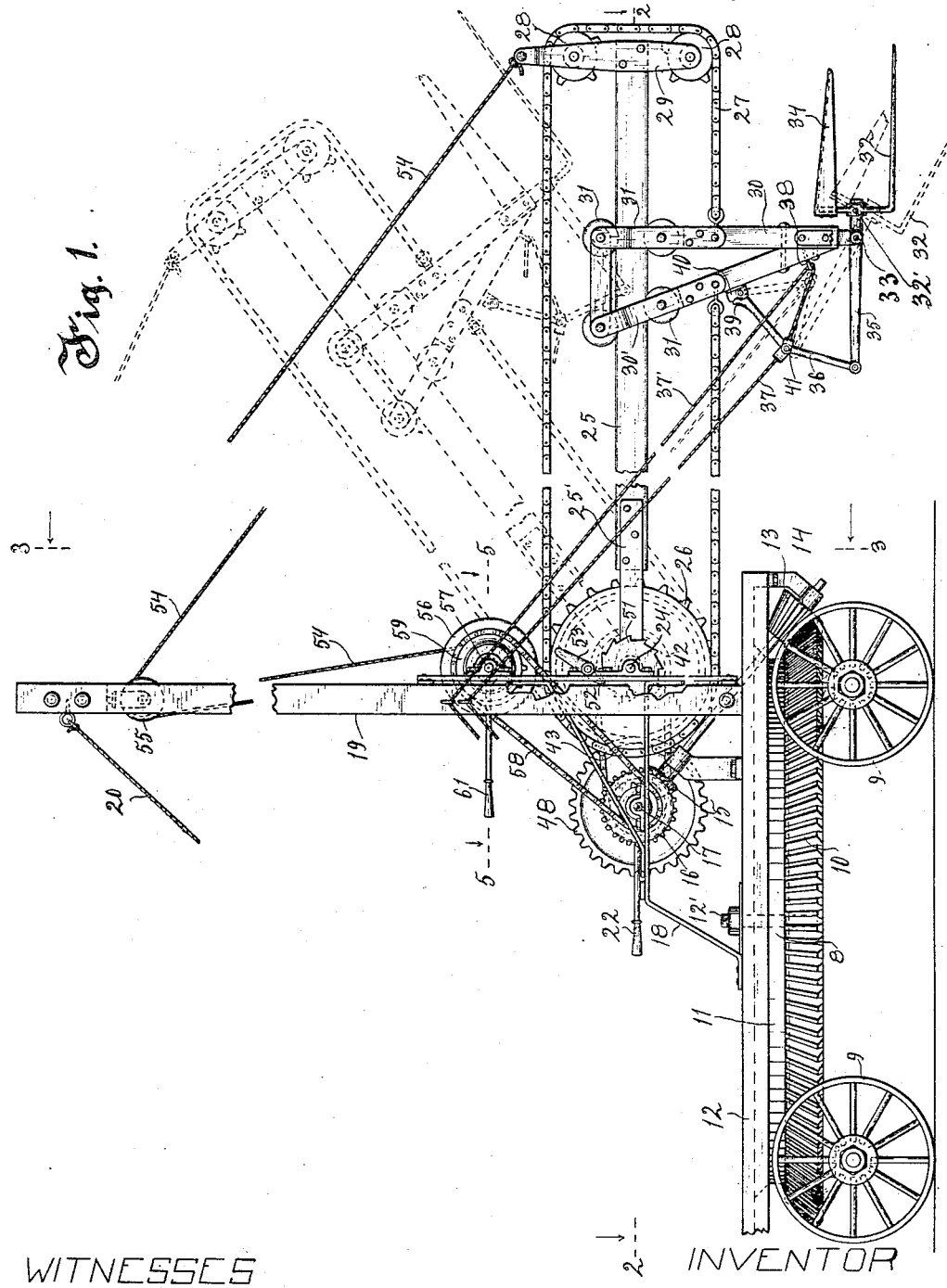
Figure 1 is a side view of the improved manure loader, parts being foreshortened for convenience of illustration, and a part of the loader being indicated in an elevated position by dotted lines.

Referring to the drawings the numeral 8 indicates the base frame of the machine which is mounted upon wheels 9 for convenience in transporting the loader from place to place. This base frame also carries a large bevel gear 10 having an inner upwardly extending annular bearing ring 11 upon which the turnable platform 12 rests. The said platform is also provided with a bearing ring 13 which rests upon the bearing ring 11 of the base frame. The platform is revolubly held on the base frame by a king bolt 12'.

A beveled pinion 13 in mesh with the bevel gear 10 is mounted on a shaft 14 which is journaled on the platform and extends upwardly at an oblique angle through the platform. The upper end of the shaft is provided with a bevel pinion 15 which is adapted to mesh with either one of two bevel gears 16 and 16' slidably mounted on a horizontally extending shaft 17. This shaft 17 is journaled in a supporting frame 18 mounted on the rotatable platform 12, and the frame is also connected to and serves to brace the derrick members 19 mounted on said platform. These derrick members converge upwardly toward each other and are bolted together at their upper ends to form a rigid structure, and the structure is further braced by guy ropes 20 extending from said upper end to the opposite rear corners of the platform.

The bevel gears 16 and 16' are connected together and are splined on the shaft 17 and are adapted to be moved into and out of mesh with the bevel pinion 15 in order to rotate said pinion in either direction, or to disconnect the pinion from either beveled gear by moving the gears to intermediate position when it is desired to have the platform remain at rest.

The shaft 17 is rotated by a sprocket wheel connection 21 with a source of motion or by any other means desired.

In order to control the position of the gears 16 and 16' a clutch lever 22 fulcrumed on the frame 18 has an inner bifurcated end portion which straddles the grooved connecting hub 23 of the said beveled gears so that said gears may be moved as desired.

The portion of the frame 18 adjacent the derrick members has journaled thereon a horizontal boom shaft 24 upon which the inner end of the boom arm 25 is pivotally mounted.

The inner end of this arm is provided with opposite pivotal plates 25' which extend on opposite sides of a large sprocket wheel 26 mounted on the shaft 24, and engage said shaft as before mentioned. This sprocket wheel 26 carries a sprocket chain 27 which extends therefrom outwardly in lines parallel with and above and below the boom and around two idle sprocket wheels 28 mounted on a vertical transverse end member 29 secured to the outer end of the boom arm. The ends of the sprocket chain are connected to a carrier frame 30 which is mounted to travel forwardly and backwardly on the boom arm 25. The sprocket chain 27 forms approximately an endless chain to which the carrier is connected. Grooved rollers 31 engaging the upper and lower edges of the boom arm are journaled in the carrier frame and serve to eliminate friction between the carrier and the boom to a large extent and to hold the carrier on the boom. The carrier frame is of V-formation and the upper plates 30' of said frame extend on both sides of the boom to more firmly hold the carrier on said boom. The lower end of the carrier frame has a forked member 32 and a holder member 34 connected thereto by the hinged connection 33 whereby the members may be swung downwardly to charging and discharging positions and to horizontal or load supporting as shown in Fig. 1.

In order to use either the forked member 32 or the holder or shovel member 34 to gather material both members are connected together and are revolubly mounted on the forward end of the lever 35 which is connected to the carrier by the hinged connection 33 before mentioned. A pin 32' locks the member 32 or 34 in operative positions to gather material. The rear end of the arm 35' extends rearwardly from the hinged connection 33 and has a toggle link connection 36 with a portion of the carrier frame 30. A pull rope 37 connected to the toggle links has one of its end portions 37' extending forwardly through an eye 38 and then rearwardly to one of the derrick members and is loosely connected thereto. The other end of the rope extends directly rearwardly to the derrick member and is also loosely connected thereto. The upper link of the toggle is provided with a stop 39 which engages a corresponding part 40 provided on the carrier frame to limit the outward movement of the joint 41 of the links. When the links are in their outermost position the central pivotal connection is out of alinement with the other pivotal connections and the parts are therefore locked until the medial pivotal joint is pulled toward the carrier frame by the end portion 37' of the rope as indicated by dotted lines in Fig. 1 so that the movement of the forked member and the holder or shovel may be easily controlled from the platform.

The shaft 24 upon which the sprocket wheel 26 is mounted also has mounted thereon a sprocket wheel 42 which has a sprocket chain connection 43 with a clutch sprocket wheel 44 loosely journaled on the shaft 17. The slidable clutch member 45 of the clutch sprocket wheel is splined on the shaft 17 and is moved into and out of engagement with the said sprocket 44 by a clutch lever 46 fulcrumed on the frame 18.

The shaft 24 is also provided with a clutch gear 47 journaled thereon which meshes with a gear 48 fixedly mounted on the shaft 17. A clutch member 49 splined on the shaft 24 and controlled by the clutch lever 50 is adapted to clutch and unclutch the gear 48 from the shaft 24. This geared and sprocket chain connection between the shafts 14 and 24 provides for rotating the shaft 24 in either direction regardless of the direction of rotation of the shaft 17.

A ratchet wheel 51 mounted on one end portion of the shaft 24 is adapted to be engaged by a ratchet pawl 52 mounted on one of the derrick members 19 to prevent movement of the shaft in one direction. A hand lever 53 connected to the ratchet pawl 52 provides for conveniently swinging the pawl out of engagement with the ratchet wheel.

The outer end of the boom 25 is raised and lowered and supported by a cable 54 which is connected to said outer end and extends upwardly and over a pulley 55 mounted at the upper end of the derrick and from thence downwardly and around a drum 56 fixedly mounted on a shaft 57.

The shaft 57 is journaled in the frame 18 and is rotated by a sprocket wheel and sprocket chain connection 58 with the shaft 17. The clutch sprocket wheel 59 forming part of this connection is journaled on the shaft 57 and is engaged by the clutch member 60 splined on said shaft 57 to clutch the sprocket wheel to said shaft. A lever 61 fulcrumed on one of the derrick members 19 is provided for controlling the movement of the clutch member The shaft 57 is also provided with a ratchet wheel 62 which is engaged by a pawl 63 fulcrumed on one of the derrick members 19.

A handle 64 is connected to the pawl 63 and projecting outwardly from the derrick member for convenience in swinging the pawl out of and into engagement with the ratchet wheel. This pawl serves to lock the drum against retrograde movement.

From the foregoing description it will be seen that the manure loader is of simple construction and is well adapted for the purpose described.

What I claim as my invention is:

1. A carrier for a manure loader, comprising a carrier frame, a tiltable lever mounted on the lower end of the frame, a toggle link connected to the rear end of the lever and to the frame, and material engaging means mounted on the forward end of the lever and movable to material engaging position.

2. A manure loader, comprising a support including a derrick and a swingable boom, a carrier frame slidably mounted on the boom portion of the support, means for moving said frame on said boom, a tiltable lever mounted on the lower end of the frame, a toggle link connected to the rear end of the lever and to the frame, and material engaging means mounted on the forward end of the lever and movable to material engaging and discharging positions, said material engaging and discharging positions being permitted by the movement of the derrick and the boom.

In testimony whereof, I affix my signature, in presence of two witnesses.

ROBERT J. F. TELTZROW.

Witnesses:
 GUSTAV BESKE,
 E. C. BESKE.

Copies of this patent may be obtained for five cents each, by addressing the "Commissioner of Patents, Washington, D. C."